United States Patent
Rastegar

(10) Patent No.: US 10,003,240 B2
(45) Date of Patent: Jun. 19, 2018

(54) METHODS FOR GENERATING POWER FROM MINIATURE ELECTRICAL GENERATORS AND POWER SOURCES

(71) Applicant: Jahangir S Rastegar, Stony Brook, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days. days.

(21) Appl. No.: 15/449,734

(22) Filed: Mar. 3, 2017

(65) Prior Publication Data

US 2017/0179791 A1   Jun. 22, 2017

Related U.S. Application Data

(63) Continuation of application No. 14/752,961, filed on Jun. 28, 2015, now Pat. No. 9,590,474.

(60) Provisional application No. 62/026,003, filed on Jul. 17, 2014.

(51) Int. Cl.
   *F02B 63/04*   (2006.01)
   *F02B 67/04*   (2006.01)
   *H02K 7/18*    (2006.01)

(52) U.S. Cl.
   CPC .................. *H02K 7/1853* (2013.01)

(58) Field of Classification Search
   USPC ........................................... 290/1 E
   See application file for complete search history.

(56) References Cited

U.S. PATENT DOCUMENTS

| | | | | |
|---|---|---|---|---|
| 3,573,479 A | * | 4/1971 | Rieth | F21L 13/08 290/1 E |
| 4,228,360 A | * | 10/1980 | Navarro | F03B 13/1885 290/43 |
| 4,610,140 A | * | 9/1986 | Thompson, Jr. | F03B 13/1815 474/148 |
| 4,612,768 A | * | 9/1986 | Thompson, Jr. | F03B 13/1815 60/506 |
| 5,363,445 A | * | 11/1994 | Shyu | H02J 7/32 310/50 |
| 5,424,582 A | * | 6/1995 | Trepl, II | F03B 13/1865 290/42 |
| 5,929,531 A | * | 7/1999 | Lagno | F03B 13/262 290/42 |
| 6,825,574 B1 | * | 11/2004 | Mooring | F03D 1/00 290/1 R |

(Continued)

*Primary Examiner* — Pedro J Cuevas

(57) ABSTRACT

A method for generating electrical power, the method including: storing potential energy in an elastic element having one end attached to a shaft and another end attached to a structure upon rotation of the shaft relative to the structure in a first angular direction; and moving a retaining mechanism between an engaged position for retaining the shaft from rotating in a second angular direction opposite to the first angular direction and a power generating position permitting the shaft to rotate in the second angular direction; wherein when the retaining mechanism is moved to the power generating position, the stored potential energy in the elastic element is converted to kinetic energy to rotate the shaft which in turn rotates a generator operatively coupled to the shaft so as to produce electrical power.

7 Claims, 8 Drawing Sheets

(56) References Cited

U.S. PATENT DOCUMENTS

| | | | | |
|---|---|---|---|---|
| 7,304,398 B1* | 12/2007 | Kim | ................ | F03G 7/00 290/1 E |
| 7,476,984 B2* | 1/2009 | Kim | ................ | F03G 7/08 290/1 E |
| 7,589,428 B2* | 9/2009 | Ghassemi | ................ | F03G 7/08 290/1 A |
| 7,626,279 B2* | 12/2009 | Brown | ................ | F03G 7/08 290/1 R |
| 7,834,471 B2* | 11/2010 | Cripps | ................ | F03G 1/02 290/1 A |
| 7,847,421 B2* | 12/2010 | Gardner | ................ | F03G 7/08 290/1 E |
| 7,893,551 B2* | 2/2011 | Dai | ................ | H02K 7/1853 290/1 C |
| 8,030,786 B2* | 10/2011 | Jackson | ................ | H02K 35/02 290/1 E |
| 8,123,431 B2* | 2/2012 | Chen | ................ | E01C 9/00 290/1 R |
| 8,148,832 B2* | 4/2012 | Cripps | ................ | F03G 1/02 290/1 E |
| 8,164,204 B2* | 4/2012 | Jang | ................ | F03B 13/00 290/1 R |
| 8,183,746 B2* | 5/2012 | Rastegar | ................ | F42C 11/008 102/207 |
| 8,350,394 B2* | 1/2013 | Cottone | ................ | H01L 41/125 290/1 E |
| 8,390,137 B2* | 3/2013 | Bryfogle | ................ | H02K 7/1876 290/1 R |
| 8,461,700 B2* | 6/2013 | Kennedy | ................ | F03G 7/08 290/1 R |
| 8,461,701 B2* | 6/2013 | Kennedy | ................ | F03G 7/08 290/1 E |
| 8,466,570 B2* | 6/2013 | Kennedy | ................ | F03G 7/08 290/1 R |
| 8,466,571 B2* | 6/2013 | Kennedy | ................ | F03G 7/08 290/1 R |
| 8,471,395 B2* | 6/2013 | Kennedy | ................ | F03G 7/08 290/1 R |
| 8,803,341 B2* | 8/2014 | Hendrickson | ................ | E01C 9/00 290/1 R |
| 8,872,363 B2* | 10/2014 | Almalki | ................ | F03D 9/00 290/1 R |
| 8,901,759 B2* | 12/2014 | Pirisi | ................ | H02K 7/1876 290/1 R |
| 8,928,160 B2* | 1/2015 | Jang | ................ | F03G 7/08 290/1 R |
| 9,183,747 B2* | 11/2015 | Almalki | ................ | F03D 9/00 |
| 9,212,654 B2* | 12/2015 | Kennedy | ................ | F03G 7/08 |
| 9,287,753 B2* | 3/2016 | Jang | ................ | F03G 7/08 |
| 9,341,167 B2* | 5/2016 | Kennedy | ................ | F03G 7/08 |
| 9,366,234 B2* | 6/2016 | Sanchez | ................ | F03D 9/10 |
| 9,366,239 B2* | 6/2016 | Kennedy | ................ | F03G 7/08 |
| 9,410,537 B2* | 8/2016 | Kennedy | ................ | F03G 7/08 |
| 9,470,214 B2* | 10/2016 | Kennedy | ................ | F03G 7/08 |
| 9,590,474 B2* | 3/2017 | Rastegar | ................ | H02K 7/1853 |
| 2007/0007827 A1* | 1/2007 | Harris | ................ | H02K 35/04 310/15 |
| 2007/0210580 A1* | 9/2007 | Roberts | ................ | F03G 7/08 290/1 R |
| 2008/0074083 A1* | 3/2008 | Yarger | ................ | H01M 6/5033 320/137 |
| 2008/0164701 A1* | 7/2008 | Brown | ................ | F03G 7/08 290/1 E |
| 2008/0164702 A1* | 7/2008 | Brown | ................ | F03G 7/08 290/1 E |
| 2008/0174120 A1* | 7/2008 | Gardner | ................ | F03G 7/08 290/1 C |
| 2010/0045119 A1* | 2/2010 | Jackson | ................ | H02K 7/1853 310/20 |
| 2010/0236440 A1* | 9/2010 | Rastegar | ................ | F42C 11/008 102/209 |
| 2013/0076043 A1* | 3/2013 | Munoz Guijosa | ................ | H02K 7/10 290/1 E |
| 2013/0207400 A1* | 8/2013 | Hassan | ................ | F03G 1/00 290/1 E |
| 2016/0020671 A1* | 1/2016 | Rastegar | ................ | H02K 7/1853 290/1 E |

\* cited by examiner

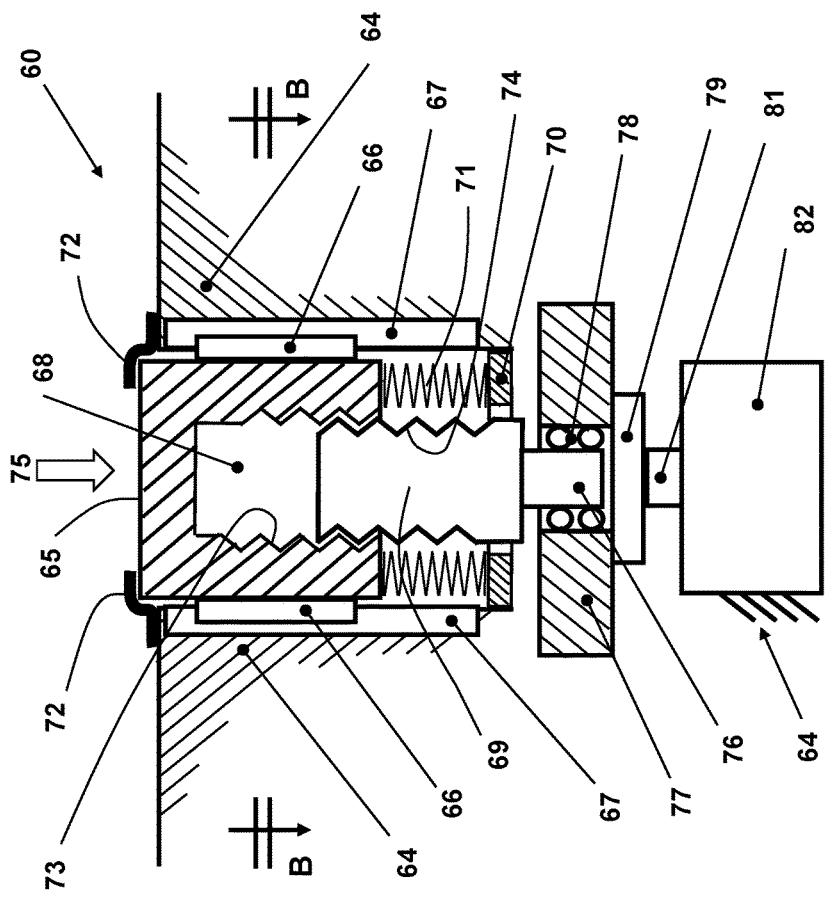
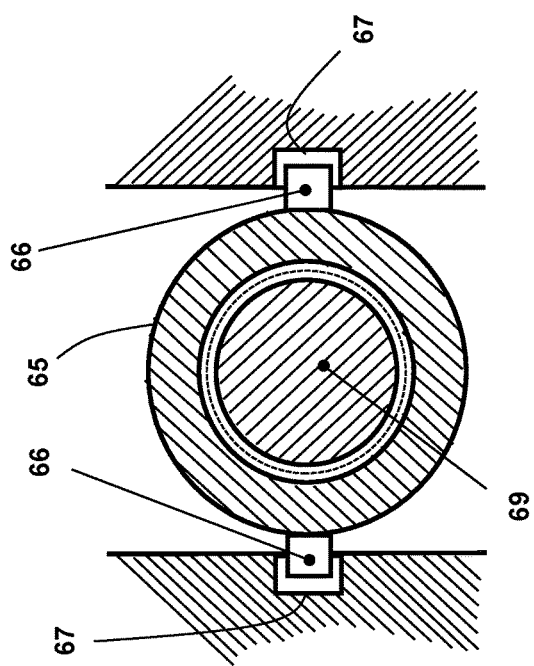

METHODS FOR GENERATING POWER FROM MINIATURE ELECTRICAL GENERATORS AND POWER SOURCES

CROSS-REFERENCE TO RELATED APPLICATION

This application is a continuation application of U.S. patent application Ser. No. 14/752,961 filed on Jun. 28, 2015, now U.S. Pat. No. 9,590,474 issued on Mar. 7, 2017, which claims the benefit of earlier filed provisional application No. 62/026,003 filed on Jul. 17, 2014, the entire contents of each of which is incorporated herein by reference.

BACKGROUND OF THE INVENTION

1. Field of the Invention

The present disclosure relates generally to miniature dynamo type electrical generators and corresponding power sources, and more particularly, to miniature electrical generators and power sources for projectiles fired by guns, mortars and the like or hand grenades and the like.

2. Prior Art

Chemical reserve batteries have long been used in various munitions, weapon systems and other similar applications in which electrical energy is required over relatively short periods of times. In addition, unique to the military is the need for munitions batteries that may be stored for up to twenty years without maintenance. Reserve batteries are batteries designed to be stored for years, even decades, without performance degradation. Reserve batteries are stored in an inert state and can be activated within a fraction of a second with no degradation of battery capacity or power. Typical Reserve batteries are thermal batteries and liquid reserve batteries.

The typical liquid reserve battery is kept inert during storage by keeping the electrolyte separate from the electrodes. The electrolyte is kept in a glass or metal ampoule inside the battery case. Prior to use, the battery is activated by breaking the ampoule and allowing the electrolyte to flood the electrodes. The ampoule is broken either mechanically or by the high g shock experienced from being shot from the cannon.

Thermal batteries represent a class of reserve batteries that operate at high temperatures. Unlike liquid reserve batteries, in thermal batteries the electrolyte is already in the cells and therefore does not require a distribution mechanism such as spinning. The electrolyte is dry, solid and non-conductive, thereby leaving the battery in a non-operational and inert condition. These batteries incorporate pyrotechnic heat sources to melt the electrolyte just prior to use in order to make them electrically conductive and thereby making the battery active. Thermal batteries have long been used in munitions and other similar applications to provide a relatively large amount of power during a relatively short period of time, mainly during the munitions flight. Thermal batteries have high power density and can provide a large amount of power as long as the electrolyte of the thermal battery stays liquid, thereby conductive.

Reserve batteries are expensive to produce, primarily since the process of their manufacture is highly labor intensive and involve mostly manual assembly. For example, the process of manufacturing thermal batteries is highly labor intensive and requires relatively expensive facilities. Fabrication usually involves costly batch processes, including pressing electrodes and electrolytes into rigid wafers, and assembling batteries by hand. The reserve batteries are encased in a hermetically-sealed metal container that is usually cylindrical in shape. In munitions, thermal batteries may be initiated during launch via inertial or electrical igniters, or may be initiated later during the flight via electrical igniters. The liquid reserve batteries are usually activated during launch by breaking the electrolyte ampoule.

Chemical reserve batteries, including thermal batteries and liquid reserve batteries, are generally very expensive to produce, require specialized manufacturing processes and equipment and quality control, and are generally required to be developed for each application at hand.

All existing and future smart and guided weapons, including gun-fired projectiles, mortars, and small and large gravity dropped weapons, require electric energy for their operation. For many fuzing operations such as fuzing "safe" and "arm" (S&A) and sensory functionalities and many other "smart" fuzing and initiation functionalities, the amount of electrical energy that is needed is low and may be as low as 10-50 mJ, and even less. In fact, with such electrical energy levels, low-power electronics could be easily powered to provide the above fuzing or the like functionalities. The amount of power required to operate many other electronic components, for example those used for diagnostics and health monitoring purposes, or for receiving a communicated signal or the like is also very small and can be readily achieved with electrical energy in the above range. In all such applications, particularly for powering electronics for fuzing and other similar "safe" and "arm" functionalities, it is highly desirable to have low-cost and safe alternatives to chemical reserve batteries. This is particularly the case for the above applications since it is generally difficult to produce very small, miniature, reserve batteries of any kind.

In addition, in certain munitions applications a relatively small amount of electrical energy, sometimes as low as 10-50 mJ is required before firing to bring up at least a portion of the onboard electronics and the like and/or to transfer firing and other information into the munitions memory and the like. In such applications, electrical energy is currently provided either by onboard electronics or by electrical energy transferred to onboard capacitors using for example induction coupling or optical or radio frequency means before the firing. In certain applications liquid reserve or thermal batteries inside the munitions are initiated to provide the required electrical energy. All such options makes the design and operation of the munitions complex, add significantly to their cost and generally require a significant amount of space onboard. The latter option also has the disadvantage of if the round is not fired within a relatively short amount of time, the initiated reserve battery can no longer provide the required amount of power and the round becomes inoperative.

A need therefore exists for alternatives to chemical reserve batteries for low power applications such as pre-fire data transfer and hold powering and for powering fuzing electronics and other similar functionalities when the required electrical energy levels are low, and for powering industrial and commercial products such as self-powered health monitoring and emergency sensor.

For munitions applications, such miniature electrical generators and power sources, hereinafter referred to as power sources, have to have a very long shelf life of up to 20 years; be low cost; and be capable of being scaled to the required power level requirements, shape and size, with minimal design and manufacturing change efforts.

A need also exist for miniature power sources for munitions applications such as gun-fired munitions, mortars and grenades in which their potential energy storage springs (elastic elements) have no stored potential energy and the required potential energy is stored in them as a result of launch acceleration.

A need also exists for miniature power sources for munitions and other industrial and commercial applications in which potential energy is stored in energy storage spring (elastic) elements of the device a priori. Hereinafter, all such mechanical potential energy storage elements (whether helical or other types of springs or elastic elements or structural flexibility) will be referred to simply as springs. A release mechanism is then used to release the stored potential energy and allow it to be converted to electrical energy via a mechanical to electrical energy conversion device such as a continuously rotating or a linear or rotary vibratory magnet and coil generator device.

A need also exists for miniature power sources that are manually operated through a push button type mechanisms provided on the surface of munitions to generate electrical energy for their pre-fire or the like powering or through said push button or toggle or other similar type of on-off mechanisms to generate electrical energy for powering various industrial and commercial low power devices. The mechanical energy to electrical energy conversion elements of such power sources may be based on magnet and coil generators or piezoelectric or any other such energy conversion devices.

An objective is to provide non-chemical miniature electrical generators and corresponding power sources for the aforementioned and the like low power applications. In these power sources, mechanical potential energy can be stored in the power source and used to generate electrical energy upon occurrence of certain events, such as firing of a projectile by a gun or by the release (or ejection) of a gravity dropped weapon or through certain manual operation. This is in contrast to chemical reserve batteries in which stored chemical energy is released upon a certain event (such as firing by a gun or by an electrical charge), thereby allowing the battery to provide electrical energy.

Another objective is to provide non-chemical power sources are miniaturized and are manually operated through a push button type mechanisms provided on the surface of munitions to generate electrical energy for pre-fire or the like powering or through said push button or toggle or other similar type of on-off mechanisms to generate electrical energy for powering various industrial and commercial low power devices.

Here, a means of storing potential mechanical energy can be elastic deformation, such as in various types of spring elements and/or the structural flexibility of the structure of the system in which it is used such as the structure of a projectile or the like, and not potential energy due to gravity. It is, however, appreciated by those skilled in the art that potential energy may also be stored by other means such as by pressurizing compressible gasses such as air. The mechanical energy may be stored a priori in the said mechanical potential energy storage springs or be manually input at the time of use. The mechanical potential energy stored in the power source storage springs can then be released via certain mechanisms to be described either upon the occurrence of certain intended event(s), such as firing and/or spinning of a projectile or releasing of a gravity-dropped weapon or other events appropriate to the device employing the power source or manually through certain mechanisms. The released potential energy can then be used to generate electrical energy using well known methods such as by the use of active materials based elements such as piezoelectric elements or magnet and coil type generators.

To this end, the mechanical stored potential energy is preferably transferred to a flywheel as kinetic energy which is then used to generate electrical energy through a continuous rotation of a rotary magnet and coil generator to achieve high mechanical energy to electrical energy conversion efficiency. Gearing mechanisms may also be employed to increase speed of generator rotation to further increase the power source energy conversion efficiency.

Alternatively, the mechanical stored potential energy is used to cause vibration of a mass-spring system. The vibration energy is then transformed into electrical energy by one of the aforementioned piezoelectric, coil and magnet or the like elements.

A second object is to provide methods and mechanisms for releasing the stored potential energy in the power sources with a priori stored mechanical potential energy. Such mechanisms include various hand operated mechanisms or various external event initiated mechanisms. Examples of such event initiated mechanisms include those operated due to gun firing acceleration; deceleration of gun-fired projectile (the so-called set-forward acceleration); the process and/or mechanism of releasing (e.g., gravity dropping) the weapon from its mounting rack or the like; pulling out or ejection of a releasing element (e.g., a releasing pin or wire); actuation or breaking of a stop element or the like via detonation of small charges; etc.

For the power sources employing piezoelectric elements for converting mechanical energy of vibration to electrical energy, methods described for mass-spring systems used in the piezoelectric based power generators described in the U.S. Pat. Nos. 7,231,874 and 7,312,557 can generally be used in the construction of the disclosed power sources, particularly for those mechanical reserve power sources to be used in gun-fired projectiles and mortars which are subject to very high-G firing acceleration levels.

In addition, in such mechanical reserve power sources, the piezoelectric elements (stacks) employed to convert mechanical energy of vibration to electrical energy may also be used as sensors to measure setback and set-forward acceleration levels, target impact impulse levels and direction, the time of such events and more as described in the U.S. Pat. No. 8,701,599 or 8,266,963 or 8,205,555 or 8,191,475 or 7,762,192 or 7,762,191.

SUMMARY OF THE INVENTION

Accordingly, a method for the development of miniature electrical generators and corresponding power sources is provided. In these power sources, mechanical potential energy is stored a priori or during activation phase such as by pushing of a button or actuating of a switching mechanism in elastic elements such as springs. The stored potential energy is then released manually or upon occurrence of certain event via certain mechanisms, such as gun firing of a projectile or gravity dropping of a weapon or throwing of a hand grenade or through actuation of certain mechanism for example manually or via detonation of a small charge or the like. The released energy can then be transformed into kinetic energy of a flywheel or the like to rotate a magnet and coil rotary generator or to vibration energy of a mass-spring system, which is then harvested by mechanical to electrical energy conversion elements such as piezoelectric elements or magnet and coil elements.

Accordingly, methods and apparatus for storing potential energy in the power sources, and methods and apparatus for releasing the stored potential energy manually or upon the occurrence of several events are provided. The mechanical potential energy may be stored a priori or generated during the power source activation phase.

The event upon which the stored mechanical potential energy of the disclosed mechanical power sources is released and the start of electrical power generation can be used to provide "safe" and "arm" (S&A) or other similar safety functionality, particularly when the power source is used for powering fuzing means. The generated electrical energy may also be used to power electronic circuitry and/or logics used to provide additional "safe" and "arm" (S&A) functionality for fuzing or other similar applications. Accordingly, methods and apparatus for the "safe" and "arm" (S&A) or other safety functionality with and without electronics circuitry and/or logics are also provided.

When using mass-spring type vibrating elements in the power-source, the device mass-spring elements may be configured to be excited also by the vibration and rotary oscillations of the munitions during the flight, thereby allowing the power source to generate additional electrical energy. The power source may also be provided with the means to generate vibration of its mass-spring element during the flight due to aerodynamics forces, e.g., by the means to generate flutter.

BRIEF DESCRIPTION OF THE DRAWINGS

These and other features, aspects, and advantages of the apparatus and methods of the present invention will become better understood with regard to the following description, appended claims, and accompanying drawings where:

FIG. 7 illustrates a schematic of a "push button" type embodiment of the miniature power source which generates electrical energy each time the device "button" is depressed.

FIG. 8 illustrates the cross-sectional view B-B of the power source embodiment of FIG. 7 showing the device "button" and the provided guide in the power source body.

DETAILED DESCRIPTION OF THE PREFERRED EMBODIMENT

Although this invention is applicable to numerous and various types of devices, it has been found particularly useful in the environment of generating power onboard munitions such as gun-fired munitions, mortar and grenades. Therefore, without limiting the applicability of the invention to generating power onboard such munitions, the invention will be described in such environment. However, those skilled in the art will appreciate that the present methods and devices can also be used in generating power in other devices, including commercial and industrial sensors and other low power electronic devices for direct powering and/or for charging appropriate electrical energy storage devices such as rechargeable batteries or capacitors.

Figure 1:
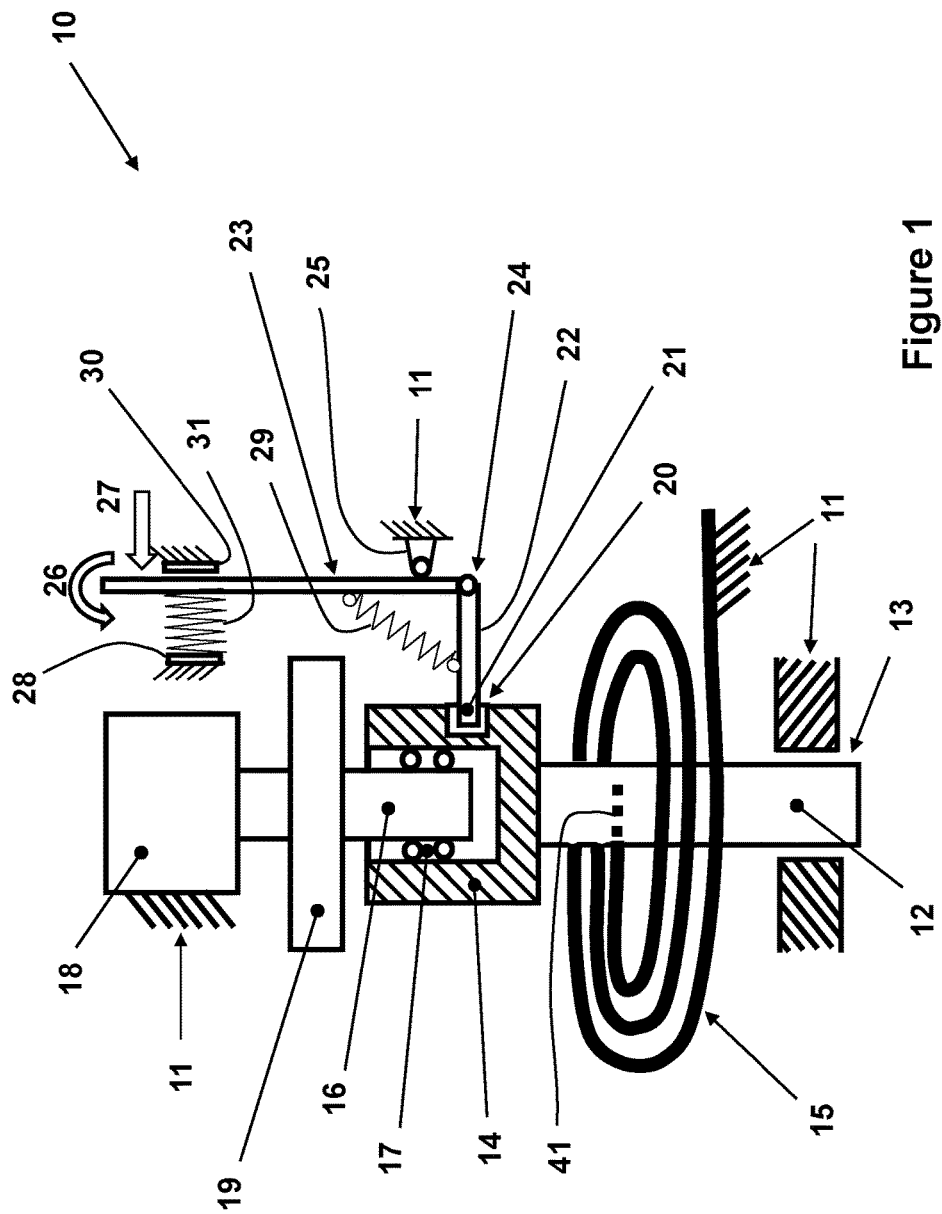
FIG. 1 illustrates a schematic of one embodiment of the miniature reserve power source with preloaded potential energy storage element and manual electrical energy generation initiation.

The basic design and operation of the first embodiment 10 of the mechanical reserve power source of the present invention is shown in the schematic of FIG. 1. The mechanical reserve power source 10 is considered to be mounted in a structure 11 of the power source. The mechanical reserve power source 10 consists of a shaft 12, which is free to rotate in the bearing 13 mounted in the device structure 11. The shaft 12 is also provided with the end piece 14 to which it is rigidly attached and which can be an integral part of the shaft 12. A torsion (such as a power type) spring 15 is also attached on one end to the structure 11 of the power source 10 and on the other end 41 to the shaft 12 as shown in FIG. 1. As can be seen in FIG. 1, a shaft 16 is provided that engages the end piece 14 of the shaft 12 via a one-way clutch 17. The shaft 16 is attached to the input of a magnet and coil dynamo 18, which is also attached to the structure 11 of the power source 10. A flywheel 19 can also be provided on the shaft 16 as shown in FIG. 1 to provide for a smooth operation of the power source 10. The end piece 14 is provided with a recess 20 which may be engaged by the tip 21 of the link 22 as shown in FIG. 1. The link 22 is in turn attached to the link 23 via the pin joint 24. The link 23 is in turn attached to the power source structure 11 by the pin joint 25.

The power source 10 is originally assembled as follows. Before engaging the tip 21 of the link 22 in the recess 20 of the end piece 14, the shaft 12 of the power source is rotated—in this case in the clockwise direction as observed from the top—to preload the torsion power spring to a desired level. The tip 21 of the link 22 is then engaged with the recess 20 of the end piece 14, thereby locking the end piece 14 to the structure 11 of the power source and preventing it to unwind the torsion power spring 15. As a result, mechanical potential energy is stored in the torsion power spring 15. The assembled power source 10 is now ready for use in the intended device.

The reserve power source embodiment 10 is designed to be manually initiated. To this end, the user would at the desired time rotate the link 23 in the counterclockwise direction as shown by the arrow 26, for example, by applying a force to the link 23 in the direction of the arrow 27, thereby causing the tip 21 of the link 22 to exit the recess 20 in the end piece 14. As a result, the end piece 14 is now free to be rotated by the preloaded torsion power spring 15. The one-way clutch 17 is directed such that the resulting clockwise (as viewed from the top) rotation of the end piece 14 would transmit the torsion power spring torque to the shaft 16. As a result, the potential energy stored in the torsion power spring 15 is transferred mostly to the flywheel 19 and the shaft 16 and the rotor of the generator 18 as kinetic energy, while the magnet and coil generator 18 would begin to transform the transferred kinetic energy to electrical energy to power the intended devices. Once the potential energy stored in the torsion power spring 15 is transferred to the assembly of the shaft 16, flywheel 19 and the generator 18, the one-way clutch 17 allows the shaft 16 to continue to rotate with respect to the end piece 14. The kinetic energy transferred to the assembly of shaft 16, flywheel 19 and rotor of the generator 18 will then keep on being transformed into electrical energy until the kinetic energy is exhausted and the assembly would come to a stop. In general, for the sake of maximizing the mechanical to electrical energy conversion efficiency, the generated electrical energy is desired to be used as generated or stored in an electrical energy storage device, such as a capacitor or a rechargeable battery.

It will be appreciated by those skilled in the art that once the end piece 14 is released by the aforementioned actuation of the release link 23, the links 22 and 23 are desired to be prevented from interfering with the operation of the moving components of the reserve power source 10. To this end, stops 28 and 30 may be provided to limit the motion of the link 23. A preloaded tensile spring 29 that connects the links 22 and 23 as shown in FIG. 1 may also be provided to pull the link 22 towards the link 23 upon disengagement with the end piece 14 and away from interfering with the motion of the other components of the power source 10. A preloaded compressive spring 31 can also be provided to bias the link 23 towards the stop 30 to prevent its accidental actuation and initiation of power generation as previously described.

Another feature that may be readily added to the reserve power source embodiment 10 of FIG. 1 is the means of proving a "safety pin" which would lock the initiating link 23 to the structure 11 of the power source. The "safety pin" can, for example, be readily included at one of the stops 28 or 30, as shown in the close up view of FIG. 2 in which this region of the reserve power source 10 of FIG. 1 is drawn with the added "safety pin" feature. In this added feature shown in FIG. 2, the link 23 is provided with an extension 33, which is provided with a hole 35. A matching extension 32 is also provided on the structure 11 of the reserve power source 10 and is also provided with a hole 34, which in the configuration shown in FIGS. 1 and 2, i.e., before the previously described initiation of the power source 10 to generate electrical energy, lines up with the hole 35. A "safety pin" 36 can then be passed through the two holes 34 and 35 to lock the link 23 to the structure 11 of the reserve power source 10. The "safety pin" 36 can be provided with a finger hole end 37 for the user to readily pull out the pin 36 and allow the user to force the link 23 to release the end piece 14 and as was previously described to initiate the power source 10 to generate electrical energy.

In the above description of the reserve power source embodiment 10, a preloaded compressive spring 31 is indicated to be used to bias the link 23 towards the stop 30 to prevent its accidental actuation and initiation of power generation. It will be, however, appreciated by those skilled in the art that the use of the aforementioned "safety pin" 36 eliminates the need for the preloaded compressive spring 31 for this purpose. The preloaded compressive spring 31 may still be desirable so that between the time of "safety pin" removal and the intended reserve power source initiation, the link 23 is not accidentally actuated to initiate the electrical energy generation.

Figure 2:
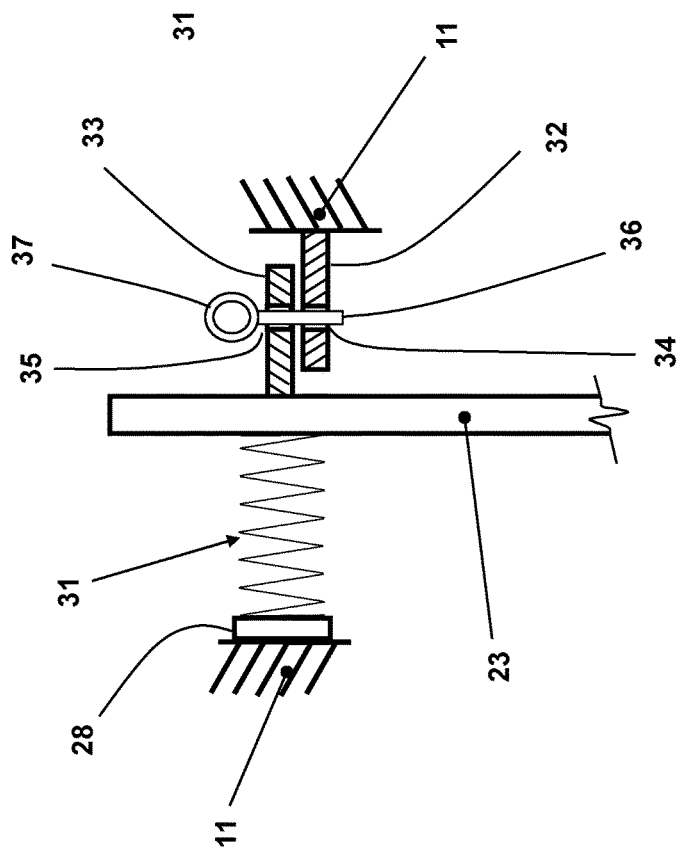
FIG. 2 illustrates an example of addition of a "safety pin" to the miniature reserve power source of FIG. 1 to prevent its accidental initiation.

In an alternative design, the spring 31, FIGS. 1 and 2, may be a preloaded tensile spring. As a result, as the "safety pin" 36 is pulled out as previously described, then the preloaded tensile spring 31 would pull on the link 23 and thereby release the end piece 14 as was previously described and initiate electrical energy generation process.

Figure 3:
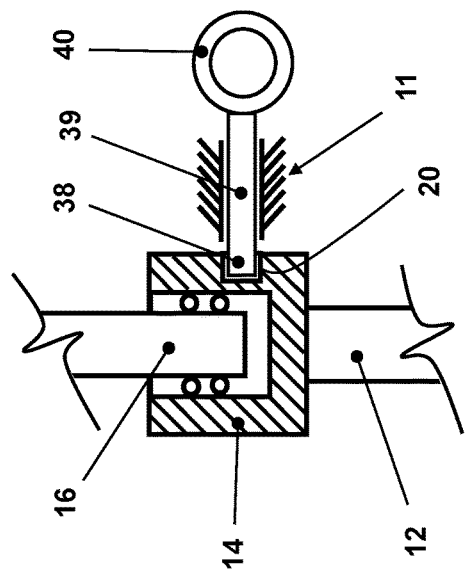
FIG. 3 illustrates another example of the addition of a "safety pin" to the miniature reserve power source of FIG. 1 to prevent its accidental initiation.

In reserve power source embodiment 10 of FIGS. 1 and 2, a mechanism consisting of links 22 and 23 is shown to be used to lock the end piece 14 to prevent the potential energy stored in the preloaded torsion power spring 15 from being released and initiate electrical energy generation. It is however appreciated by those skilled in the art that numerous other similarly functioning and manually operated mechanisms may also be used to perform the same function. Such mechanisms would only need to provide the means of pulling a locking pin, wedge, ball, etc., from engagement with the end piece 14 and thereby allowing the preloaded torsion power spring to freely rotate the end piece. As an example, as can be seen in the schematic of FIG. 3, the tip 38 of the "safety pin" 39 (36 in FIG. 2) itself may be used directly to lock the end piece 14 to the structure 11 of the reserve power source by being inserted in the recess 20 of the end piece. Then as the user pulls out (or back) the "safety pin" 39, such as via the finger hole end 40, the end piece 14 is released and the reserve power source 10 begins to generate electrical energy. As another example, a button (not shown) may be provided on the structure 11 of the reserve power source 10, which when pushed would apply a force in the direction of the arrow 27 to rotate the link 23 in the direction of the arrow 26, thereby causing the end piece 14 to be released and the reserve power source to begin to generate electrical energy as was previously described.

It will be appreciated by those skilled in the art that the any one of the above designs of the reserve power source 10 illustrated in FIGS. 1-3, and particularly the design with a "safety pin" 36, FIG. 2, with a preloaded compressive spring 31 is highly suitable for use in munitions such as hand grenades that are equipped with electronic and related devices that require electrical energy to operate. In such an application, the user must first pull out the "safety pin" 36, and then press the link (lever) 23 to initiate electrical energy generation.

Figure 4:
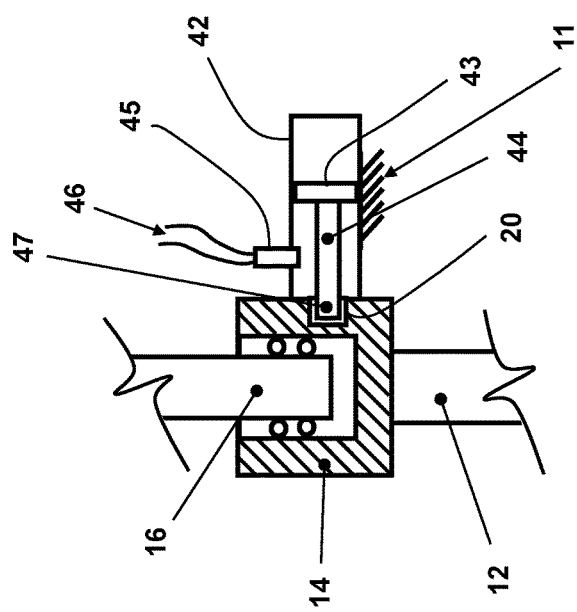
FIG. 4 illustrates another example of the addition of a "safety pin" to the miniature reserve power source of FIG. 1 which is removable by detonation of a small charge to initiate electrical energy generation.

In the reserve power source embodiment 10, with the "safety pin" shown in the schematic of FIG. 3, the "safety pin" 39 is designed to be manually removed by the user to initiate electrical energy generation. Alternatively, the means of pulling "safety pins" of different type, for example those similar to the ones in FIG. 1 or FIG. 2 or others with locking wedge elements, locking balls, etc., may be removed (pulled back or rotated away or the like) via detonation of a small charge. An example of such a "safety pin" removal mechanism actuated by the detonation of a small gas generating charge is shown in the schematic of FIG. 4. Here the mechanism is constructed as a cylinder 42 which is attached to the housing 11 of the reserve power source 10. The cylinder 42 houses a piston 43 to which a piston rod 44 is attached. In the configuration shown in FIG. 4, the tip 47 of the piston rod 44 is shown to be in engagement with the recess 20 on the end piece 14, thereby locking it to the structure 11 of the reserve power source 10. The cylinder is also provided with an electrically initiated gas generating charge 45, with the initiation wires 46. Upon initiation of the gas generating charge 45, gas pressure builds up in the cylinder 42 on the side of the gas generating charge 45, thereby forcing the piston 43 to move away from the end piece 14, thereby causing the tip 47 of the piston rod 44 to disengage the end piece, thereby allowing the reserve power source to begin to generate electrical energy.

In the "safety arm" release mechanism of FIG. 4, an electrically initiated gas generating charge is shown to be used. It is, however, appreciated by those skilled in the art that an inertially initiated gas generating charge may also be employed. Such inertially initiated devices are well known in the art (see e.g., U.S. Pat. Nos. 7,587,979; 7,587,980; 7,437,995; 8,042,469, 8,061,271; 7,832,335; 8,418,617; 8,651,022 and 8,550,001), and for munitions applications they could be designed to initiate due to the firing setback acceleration or firing set forward acceleration or due to target impact shock loading or firing spin acceleration or spinning velocity induced centripetal acceleration.

Figure 5:
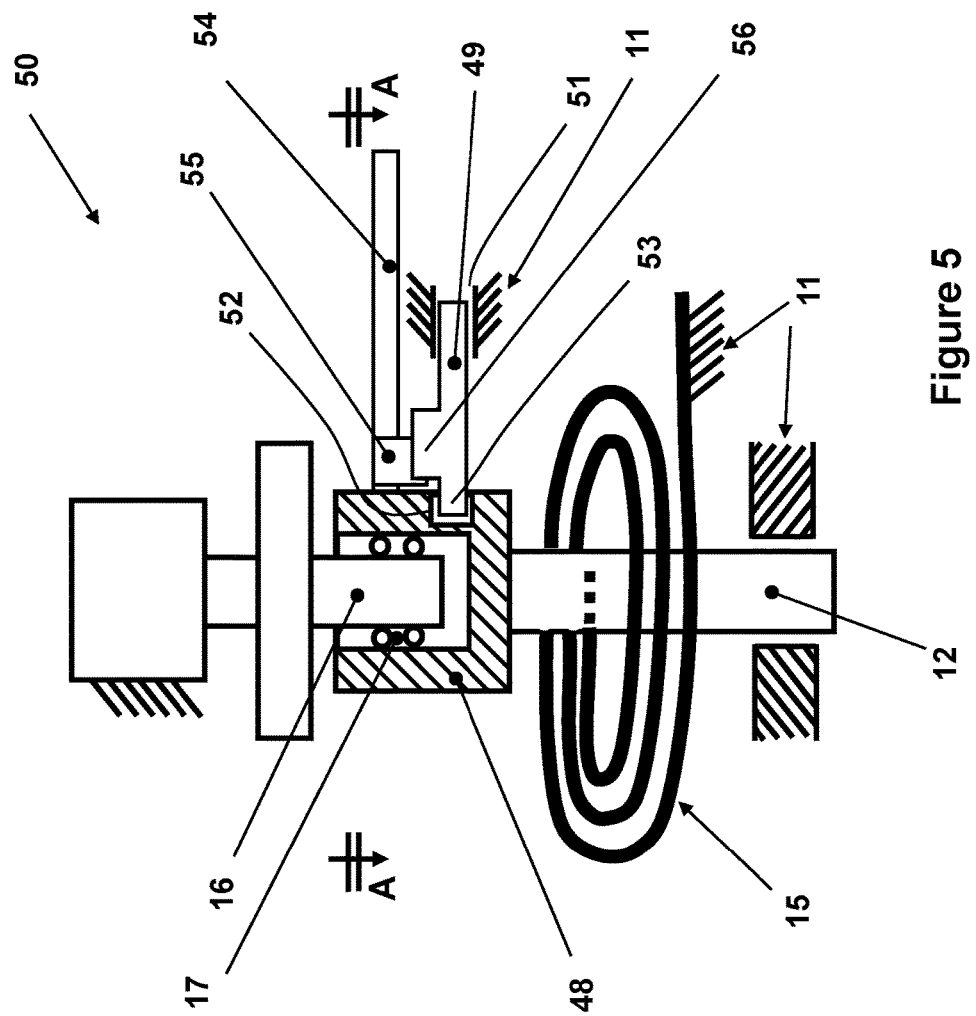
FIG. 5 illustrates a schematic of another embodiment of the miniature power source with manually operated handle actuation which first stores potential energy in the device torsion spring element and then releases a locking element to initiate electrical energy generation.

Another embodiment of a power source 50 is shown in the schematic of FIG. 5. All components of the power source 50 are identical to those of the embodiment 10 of FIG. 1, except for the modification to the end piece 48 (14 in the embodiment of FIG. 1) and its release mechanism. In addition, the torsion power spring 15 (such as a high stiffness torsion spring—hereinafter referred to as torsion spring) is not preloaded, i.e., the power source has no stored mechanical potential energy prior to the initiation process to be described. As a result, the power source 50 is no longer a "reserve" type power source.

Figure 6:
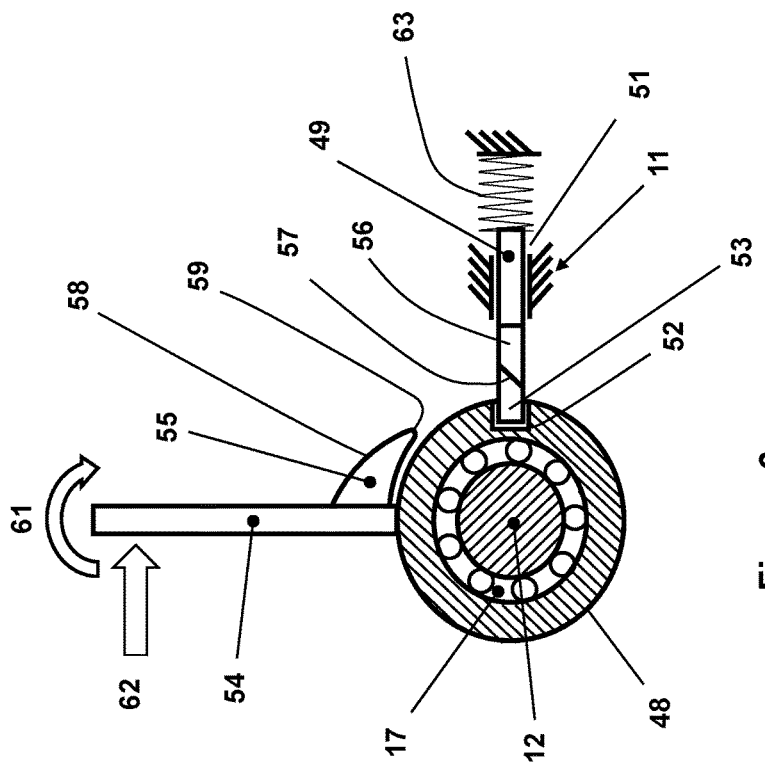
FIG. 6 illustrates the cross-sectional view A-A of the power source embodiment of FIG. 5 showing the potential energy storage and energy generation initiation mechanism of the device.

The cross-sectional view A-A, FIG. 5, showing the indicated changes to the end piece 48 and the basic method and mechanism of storing mechanical potential energy in the torsion spring 15 and its release is shown in FIG. 6.

As can be seen in the cross-sectional view A-A of FIG. 6, the end piece 48 (14 in the embodiment of FIG. 1) is provided with a similar recess 52 (20 in the embodiment of FIG. 1) and is also provided with an actuating lever 54. A locking element 49 is also provided that can slide back and forth in the sliding bearing 51 provided in the structure 11 of the power source 50. In the configuration shown in FIGS. 5 and 6, the tip 53 of the locking element 49 is in engagement with the recess 52 of the end piece 48, thereby locking it to the structure 11 of the power source and preventing the end piece and the shaft 12 from rotating. In addition, in the configuration shown in FIGS. 5 and 6, the torsion spring 15 is not preloaded and the power source would have zero stored mechanical potential energy to convert to electrical energy. The latter feature is highly desirable in devices where safety is of great importance such as in various types of munitions, such as hand grenades.

In operation, the user rotates the lever 54 and thereby the end piece 48 in the clockwise direction as shown by the arrow 61, for example by applying a force in the direction of the arrow 62 to the lever 54 as shown in FIG. 6. The resulting counterclockwise rotation of the shaft 12, FIG. 6, causes the torsion spring 15, FIG. 5, to be loaded and mechanical potential energy be stored in the torsion spring. As the lever 54 is further rotated in the counterclockwise direction and increasing amount of mechanical potential energy is stored in the torsion spring 15. The lever 54 is provided with an extension element 55 which is provided with a curved surface profile 58, FIGS. 5 and 6. The locking element 49 is also provided with an engagement top piece 56, FIGS. 5 and 6, with an inclined surface 57 as shown in FIG. 6. As can be observed in FIG. 5, the extension element 55 is sized such that it can pass over the surface of the locking element 49 (in front of the engagement top piece 56) but its surface 58 would otherwise engage the surface 57 of the engagement top piece 56. Then as the lever 54 is rotated in the clockwise direction, at some point, the tip 59 of the extension element 55 moves over the frontal surface of the locking element 49, followed by engagement of the surface 58 with the surface 57. Then as the lever 54 is rotated further in the clockwise direction, the curved surface 58 will force the locking element 49 to move to the right, FIG. 6, thereby disengaging the tip 53 of the locking element 49 from the recess 52 of the end piece 48. The torsion spring 15 will then be free to rotate the shaft 12 and thereby begin the previously described process of generating electrical energy.

It is appreciated by those skilled in the art that in the power source embodiment 50 of FIGS. 5 and 6, a preloaded compressive spring element 63, FIG. 6 (not shown in FIG. 5 for clarity) may also be added to bias the tip 53 of the locking element 49 into the engagement with the recess 52 of the end piece 48. Such a biasing spring may be desirable in cases in which the device may be subjected to incidental shock loading or vibration or the like that may cause the power source to be accidentally initiated.

In the embodiments of FIGS. 1 and 5, a torsion power spring and a torsion spring were used, respectively, to store potential mechanical energy for generation of electrical energy. It is, however, appreciated by those skilled in the art that in applications in which the shaft 12 is rotated only a small fraction of a full turn, probably at most 90-120 degrees, which is mostly the case for the power source embodiment of FIG. 5, then other types of springs such as regular or preloaded tensile or compressive springs or their combination or almost any other type of elastic element may also be similarly used for the purpose of storing mechanical potential energy.

Another embodiment of power source 60 is shown in the schematic of FIG. 7. In this embodiment 60, a "push button" element 65 is provided that can slide up and down in the structure 64 of the power source. The push button element 65 is provided with side elements 66, which are fixed to the push button element 65 and can slide freely in the guides 67 provided in the structure 64 of the power source, as shown in FIG. 7 and in the cross-sectional view B-B of the power source shown in FIG. 8. Stop element 70 which is fixed to the structure 64 of the power source is also provided to limit downward displacement of the push button element 65. At least one preloaded compressive spring 71 is also provided to bias the push button element upwards. At least one stop 72 can also be provided to limit upward displacement of the push button element 65.

In a cavity 68 provided in the push button element 65, FIG. 7, is provided a relatively large pitch threaded portion 73, which mates with a matching threaded surface 74 on a shaft 69 as shown in FIG. 7. The shaft 69 is also provided with a free end 76, over which is mounted a flywheel 77 via a one way clutch 78. The flywheel 77 is then connected to the input shaft 81 of a magnet and coil type electrical energy generator 82 via a coupling element 79 which is fixedly attached to the flywheel 77, as shown in the schematic of FIG. 7.

The internal and external threaded surface 73 and 74, respectively, are designed with relatively large pitch and are provided with enough clearance so that by pressing the push button element 65 down in the direction of the arrow 75, the shaft 69 is rotated with minimal resistance (other than inertial resistance of the flywheel, coupling 79 and rotor of the generator 82; generator 82 torque and frictional forces).

In operation, the user presses on the push button element 65 rapidly by applying a force in the direction of the arrow 75, FIG. 7. Downward translation of the push button element 65 causes the shaft 69 to rotate, transmitting the rotation through the one-way clutch 78 to the flywheel 77 and through the coupling 79 to the input shaft 81 of the electrical generator 82. The one-way clutch is configured such that while the shaft 69 is being rotated by the push button element as it moves down in the direction of the arrow 75, the motion is transmitted to the assembly of the flywheel 77, and that the flywheel 77 is free to continue to rotate once the downward translation of the push button element has ended. The user can press the push button element 65 down hard (apply a relatively large force) to transfer a relatively large amount of energy to the flywheel 77 and its assembly. The user can also press the push button element 65 down until its motion is stopped by the stops 70. The user will then allow the at least one preloaded compressive spring 71 to push the push button element 65 back to its uppermost position shown in the schematic of FIG. 7.

It will be appreciated by those skilled in the art that the work down by the user by displacing the push button element 65 downwards certain distance by applying certain amount of force is transferred to the assembly of the flywheel 77, coupling 79 and the rotor of the generator 82 as kinetic energy—less the friction and other losses and the amount of electrical energy generated during the process. The kinetic energy stored in the assembly is then transformed to electrical energy by the generator 82. In the meantime, the user can keep on pressing down on the push button element 65 and letting it bounce back by the at least one preloaded compressive spring 71, each time adding more kinetic energy to the flywheel and its assembly for conversion to electrical energy.

In the schematic of FIG. 7 regular screw threads are shown to be provided on the mating internal and external surfaces 73 and 71, respectively. It is, however, appreciated by those skilled in the art that to increase the efficiency of the power source embodiment 60 in converting the work done by the user to electrical energy by reducing the friction related losses between the contacting surfaces 73 and 71, one may instead use a ball screw. Ball screws are well known in the art and are commonly used in machinery to reduce friction losses in power screws.

It will be appreciated by those skilled in the art that the basic design and operation of the "push button" type power source embodiment is illustrated by the schematic of FIG. 7 for the sake of clearly identifying each component of the power source and describing their function and the operation of the overall power source. In practice, however, it is generally highly desirable to have a very compact power source. For example, the at least one springs 71 may be designed as a single conical spring that is assembled around the shaft 69 and collapses as the push button element 65 is pressed down into a single layer. The flywheel 77 and the rotor of the generator may also be fabricated as one unit in a pancake type generator design to significantly reduce the size of the power source for a prescribed amount of energy generation requirement. In practice, similar approaches are readily implemented on the designs of the other embodiments described previously and later in this disclosure to achieve significantly more compact power source designs.

In the power source embodiment 60, no mechanical energy storage element (spring or other type of elastic element) is used for a priori storage of mechanical potential energy. As a result, the power source 60 is a simple power source and not a "reserve" type power source. This feature of this power source of having zero stored mechanical energy prior to the electrical energy generation process to be described is highly desirable in devices where safety is of great importance, such as in various types of munitions, such as hand grenades.

Figure 9:
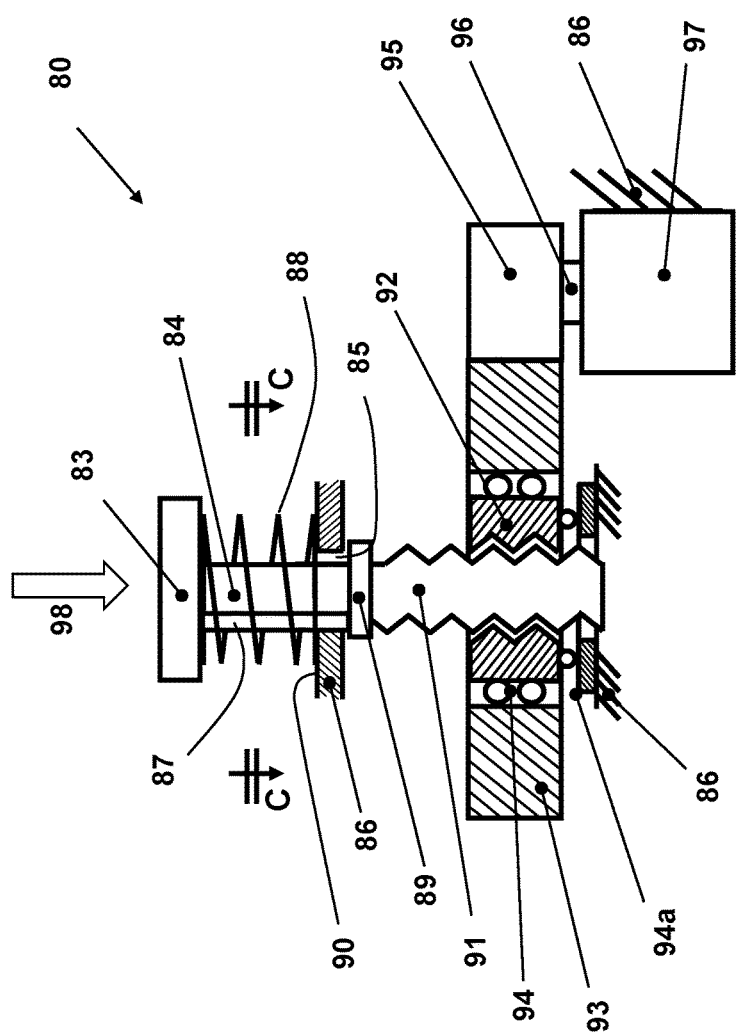
FIG. 9 illustrates a schematic of an alternative "push button" type embodiment of the miniature power source which generates electrical energy each time the device "button" is depressed.
Figure 10:
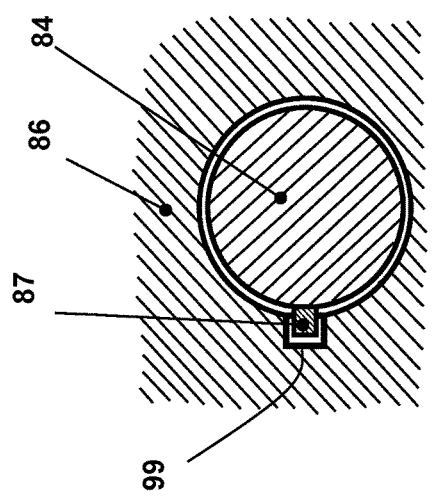
FIG. 10 illustrates the cross-sectional view C-C of the power source embodiment of FIG. 9 showing the "push button" shaft and its anti-rotation key and guide.

An alternative design 80 of the power source embodiment 60 is shown in the schematic of FIG. 9. This alternative embodiment 80 is also a "push button" type. In this embodiment 80, a "push button" element 83 with an attached shaft 84 which can slide up and down in the bearing 85 provided in the structure 86 of the power source 80. While sliding up and down in the bearing 85, the shaft 84 is prevented from rotation with respect to the structure 86 of the power source by a key member 87, which is engaged with the guide 99 in the structure 86 of the power source 80, as is shown in the cross-sectional view C-C of FIG. 10. A slightly preloaded compressive spring 88 is provided around the shaft 84 between the push button element 83 and the surface 90 of the structure 86 of the power source 80 to bias the said push button element away from the surface 90. The shaft 84 is also provided with a stop element 89 which limits the biasing action of the spring 88 as shown in the schematic of FIG. 9.

The shaft 84 is provided with a section 91, which is threaded as a high pitch screw. Mating with the threaded screw is the nut element 92, over which is mounted a flywheel 93, via a one-way clutch 94. A thrust bearing 94*a* is provided under the nut element 92 to support the nut element 92 against the structure 86 of the power source 80. In this embodiment of the present invention, the flywheel 93 is fabricated with outside gearing that engages with a pinion 95, which is mounted on a shaft 96 of a magnet and coil electrical generator 97. The use of the gearing allows the rotary speed of the electrical generator 97 to be increased and thereby increasing the amount of electrical power that the generator 97 can produce.

In operation, the user presses on the push button element 83 by applying a force in the direction of the arrow 98, FIG. 9. Downward translation of the push button element 83 and the shaft 84 causes the threaded section 91 to rotate the nut element 92. The nut element 92 in turn will rotate the flywheel 93 through the one-way clutch 94. The flywheel 93 (outer gear) will in turn rotate the pinion 95, which would directly rotate the rotor shaft 96 of the electrical generator 97. Electrical energy thereby begins to be generated by the electrical generator 97. The one-way clutch 94 is configured such that while the nut element 92 is being rotated by the threaded section 91 of the push button shaft 84 as the push button 83 is being translated down in the direction of the arrow 83, the rotation of the nut element 92 is transmitted to the flywheel 93, and the flywheel 93 is free to continue to rotate once the downward translation of the push button element has ended.

The user can press the push button element 83 down hard (apply a relatively large force) to transfer a relatively large amount of energy to the flywheel 93. The user can also press the push button element 83 down until its motion is stopped by the stops 89. The user will then allow the preloaded compressive spring 88 to push the push button element 83 back to its uppermost position shown in the schematic of FIG. 9.

It will be appreciated by those skilled in the art that the work down by the user by displacing the push button element 83 downwards a certain distance by applying a certain amount of force is transferred to the assembly of the flywheel 93, pinion 95, the nut element 92 and the rotor of the generator 97 as kinetic energy—less the friction and other losses and the amount of electrical energy generated during the process. The kinetic energy stored in the assembly is then transformed to electrical energy by the generator 97. In the meantime, the user can keep on pressing down on the push button element 83 and letting it bounce back by the spring 88, each time adding more kinetic energy to the flywheel and its assembly for conversion to electrical energy.

Figure 11:
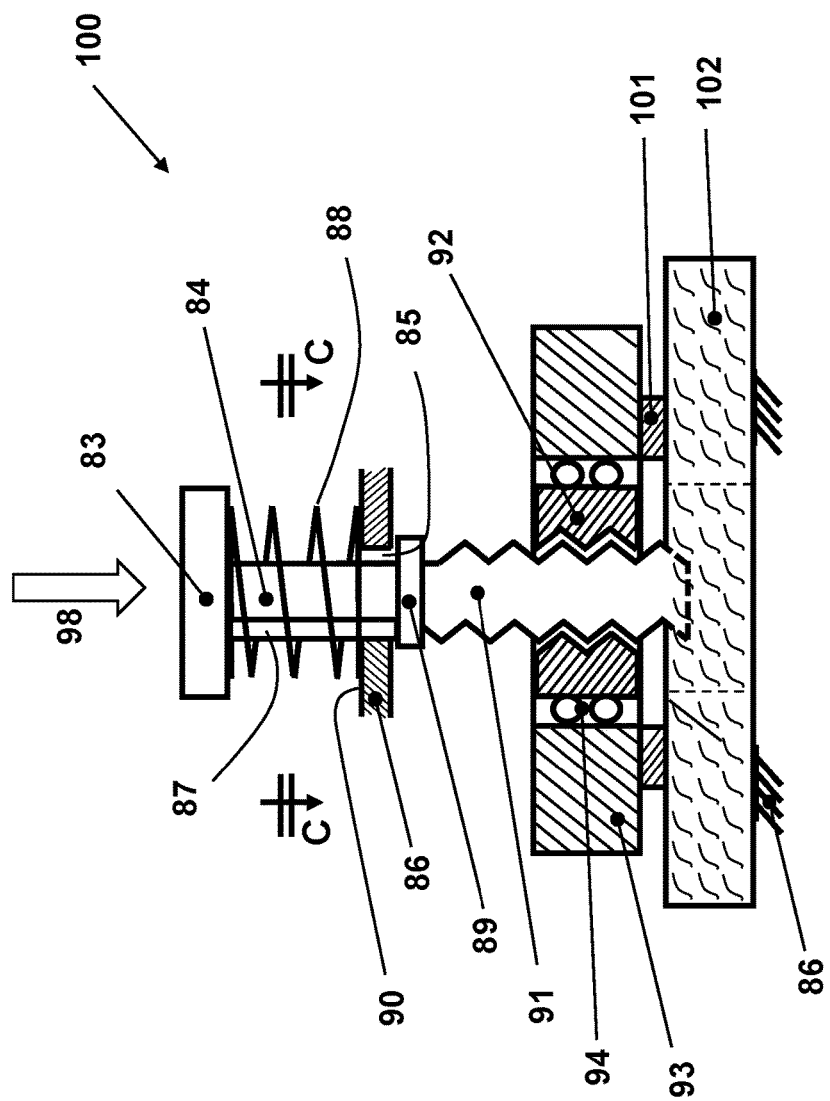
FIG. 11 illustrates a schematic of another alternative "push button" type embodiment of the miniature power source which generates electrical energy each time the device "button" is depressed.

Yet another embodiment 100 of the power source embodiment 60 is shown in the schematic of FIG. 11. This alternative embodiment 100 is also a "push button" type. The design and operation of this embodiment is the same as the embodiment 80 of FIGS. 9 and 10 and is indicated with the same numerals, except for the method and components for transferring motion and mechanical energy from the flywheel 93 to the electrical energy generator type employed. In the embodiment 100 of FIG. 11, a coupling element 101 is fixedly attached to the flywheel 93. The coupling element 101 is annular in shape to prevent interference with the motion of the nut element 92, the one-way clutch 94 and the threaded portion 91 of the push button shaft 84. The coupling element 101 is then directly connected to the rotating side of the pancake type magnet and coil electrical generator 102, which is in turn fixed to the structure 86 (body) of the power source 100. The pancake type electrical generator 102 type used is the one with open center to allow for the motion of the threaded portion 91 of the push button shaft 84 and which is provided with a thrust or other bearing that can support an axial load in reaction to the force applied to the push button element 83 to drive the push button shaft 84 down in the direction of the arrow 98.

The operation of the "push button" power source 100 is the same as that of the embodiments 60 and 80 of FIGS. 7 and 9, respectively. In operation, the user presses on the push button element 83 by applying a force in the direction of the arrow 98, FIG. 11. Downward translation of the push button element 83 and the shaft 84 causes the threaded section 91 to rotate the nut element 92. The nut element 92 in turn will rotate the flywheel 93 through the one-way clutch 94. The flywheel 93 will in turn rotate the electrical generator 102 via the coupling 101. Electrical energy thereby begins to be generated by the electrical generator 102. The one-way clutch 94 is configured such that while the nut element 92 is being rotated by the threaded section 91 of the push button shaft 84 as the push button 83 is being translated down in the direction of the arrow 83, the rotation of the nut element 92 is transmitted to the flywheel 93, and that the flywheel 93 is free to continue to rotate once the downward translation of the push button element has ended.

In the above power source embodiments 50, 60, 80 and 100 of FIGS. 5, 7, 9 and 11, respectively, a spring (elastic) element is deformed by direct rotation of a link (power source 50 of FIG. 5) or translation of an element (power sources 60, 80 and 100) by the user. The motions would in turn deform a spring (elastic) element and store mechanical potential energy in the spring (elastic) element. Alternatively, a number of linkage and/or gear mechanisms or other similar mechanical motion or force amplifying or reducing or otherwise modifying mechanisms may be provided to increase the performance of the power source, i.e., the amount of electrical energy and/or power that it can generate and/or reduce its size or vary its finished shape to certain available or desirable shape.

It is appreciated by those skilled in the art that the electrical energy generated by the above embodiments may either be used directly to power certain electrical or electronic circuitry and/or to store in certain electrical energy storage device, such as capacitors, super-capacitors or rechargeable batteries. In almost all such cases the electrical energy generated by the power sources have to be regulated by electronic and logic circuitry to provide electrical power to the intended electrical power consuming devices. The block diagram of the resulting typical electrical power system is shown in FIG. 12.

Figure 12:
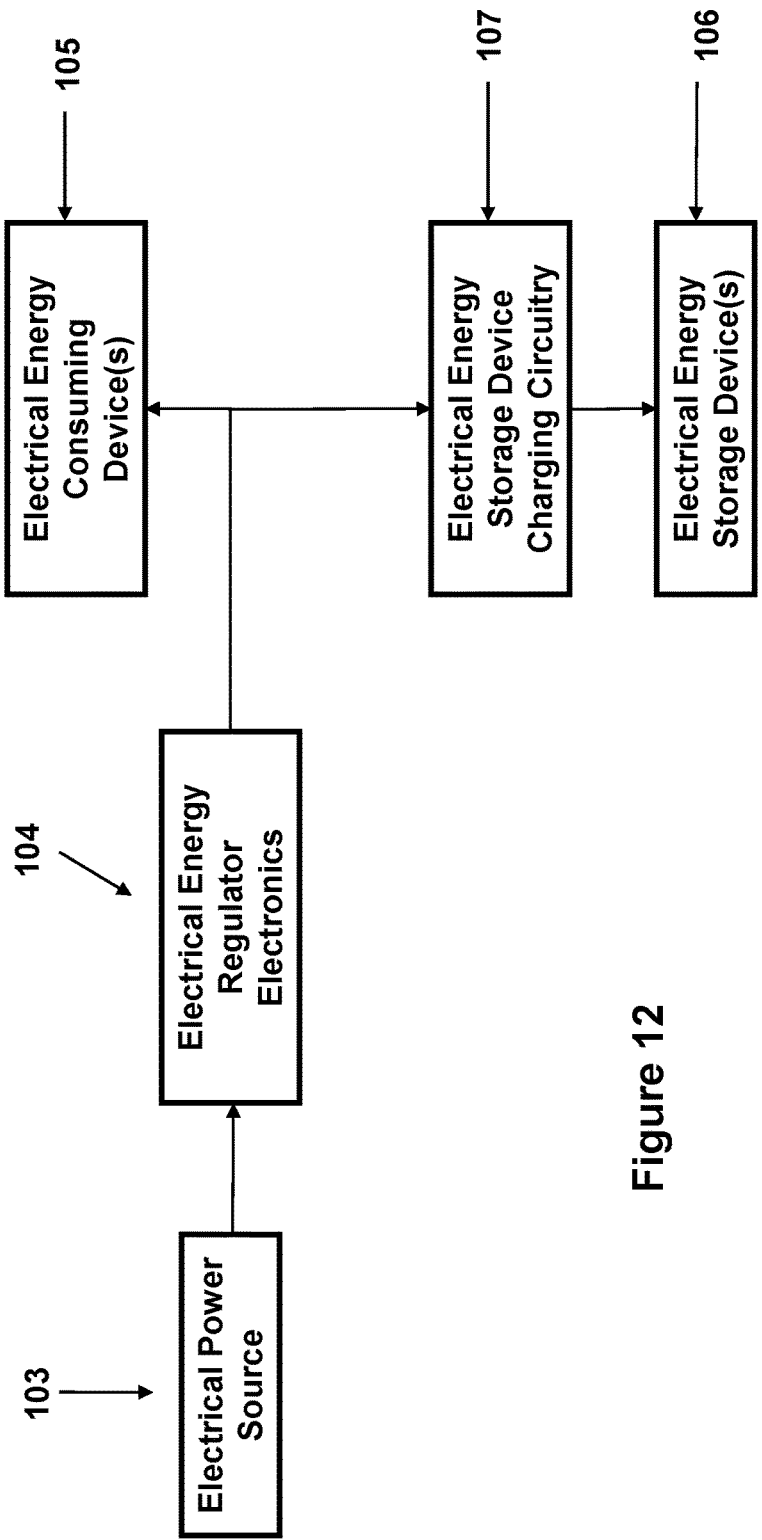
FIG. 12 illustrates the block diagram of a typical electrical power system and the electrical energy consuming or storage system.

In FIG. 12, the block 103 is intended to indicate one or more of the disclosed power sources 10, 50, 60, 80 and 100 of FIGS. 1, 5, 7, 9 and 11, respectively. The electrical energy generated by the power source(s) is then regulated by the electronic and logic circuitry 104 and used directly in the electrical energy consuming device 105 and/or used to charge the electrical energy storage device such as a rechargeable battery or capacitor 106. In general, a related charging circuitry 107 is also required for safe charging of any electrical energy storage device 106.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention claimed is:

1. A method for generating electrical power, the method comprising:
   storing potential energy in an elastic element having one end attached to a shaft and another end attached to a structure upon rotation of the shaft relative to the structure in a first angular direction; and
   moving a retaining mechanism between an engaged position for retaining the shaft from rotating in a second angular direction opposite to the first angular direction and a power generating position permitting the shaft to rotate in the second angular direction;
   wherein when the retaining mechanism is moved to the power generating position, the stored potential energy in the elastic element is converted to kinetic energy to rotate the shaft which in turn rotates a generator operatively coupled to the shaft so as to produce electrical power.

2. The method of claim 1, further comprising preventing an unintended movement from the engaging position to the power generating position.

3. The method of claim 1, further comprising preloading the elastic element to store the potential energy.

4. A method for generating electrical power, the method comprising:
   converting a translation of a translating member slidably disposed in a structure into a rotation of a shaft operatively coupled to the translating member upon an application of a force to the translating member; and
   engaging an input shaft of a generator with the shaft only when the shaft rotates in a predetermined rotational direction.

5. The method of claim 4, further comprising biasing the translating element against the application of the force.

6. A method for generating electrical power, the method comprising:
   converting a translation of the translating member slidably disposed in a structure to a rotation of a rotating member operatively coupled to the translating member upon an application of a force to the translating member;

engaging the input shaft of a generator with the rotating member only when the rotating member rotates in a predetermined rotational direction.

7. The Method of claim 6, further comprising biasing the translating element against the application of the force.

\* \* \* \* \*